United States Patent
Brown et al.

(10) Patent No.: US 6,546,431 B1
(45) Date of Patent: Apr. 8, 2003

(54) DATA PROCESSING SYSTEM AND METHOD FOR SHARING USER INTERFACE DEVICES OF A PROVIDER ASSISTIVE TECHNOLOGY APPLICATION WITH DISPARATE USER ASSISTIVE TECHNOLOGY APPLICATIONS

(75) Inventors: Frances C. Brown, Austin, TX (US); Richard S. Schwerdtfeger, Round Rock, TX (US); Lawrence Frank Weiss, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/268,087

(22) Filed: Mar. 12, 1999

(51) Int. Cl.$^7$ ................................................. G06F 9/46
(52) U.S. Cl. ..................... 709/313; 709/319; 709/321
(58) Field of Search .............................. 710/36, 37, 38, 710/67; 713/100; 717/166; 709/313, 315, 319, 321, 324

(56) References Cited

U.S. PATENT DOCUMENTS

| | | | |
|---|---|---|---|
| 4,475,156 A | | 10/1984 | Federico et al. |
| 5,062,037 A | | 10/1991 | Shorter et al. |
| 5,201,049 A | | 4/1993 | Shorter |
| 5,252,951 A | * | 10/1993 | Tannenbaum et al. ...... 345/156 |
| 5,812,820 A | * | 9/1998 | Loram ........................ 395/500 |
| 5,916,310 A | * | 6/1999 | McCain ........................ 710/67 |
| 6,074,432 A | * | 6/2000 | Guccione ....................... 717/2 |
| 6,085,120 A | * | 7/2000 | Schwerdtfeger et al. ...... 700/90 |
| 6,128,011 A | * | 10/2000 | Peng ........................... 345/335 |
| 6,237,053 B1 | * | 5/2001 | Herrod et al. ................. 710/65 |

OTHER PUBLICATIONS

William D. Walker et al., "Making the X Window System Accessible to people with disabilities", p. 3–9, 1993.*
Earl Johnson et al., "Making the X Window System More Accessible, the DACX Project", p. 4–6, 1994.*
Java™ 2 SE v1.2.2API Specification, 1998.*

* cited by examiner

Primary Examiner—Zarni Maung
Assistant Examiner—Gregory Clinton
(74) Attorney, Agent, or Firm—Duke W. Yee; Jeffrey S. LaBaw; Stephen J. Walder, Jr.

(57) ABSTRACT

A data processing system and method providing for the sharing of inputs and outputs between a first assistive technology application and a second assistive technology application. An input/output manager in the first application is used to manage inputs to and outputs from the second application. An input method in the first application sends input to the second application. An output method in the first application receives output from the second application. A channel is formed between the input/output manager and the input and output methods to pass input and output that allows assistive technology applications to share user interface devices.

15 Claims, 4 Drawing Sheets

DATA PROCESSING SYSTEM AND METHOD FOR SHARING USER INTERFACE DEVICES OF A PROVIDER ASSISTIVE TECHNOLOGY APPLICATION WITH DISPARATE USER ASSISTIVE TECHNOLOGY APPLICATIONS

BACKGROUND OF THE INVENTION

1. Technical Field

This invention relates generally to data processing systems and, more particularly, it relates to a system and method for connecting and sharing input and output between a first assistive technology application running in an operating system and a second assistive technology application environment running in the same operating system.

2. Description of the Related Art

A typical data processing system comprises a host processing unit having an operating system native to it which supports the creation of a large number of virtual machines, each of which is assigned, on request, to an end user. A virtual machine processes tasks for the assigned end user, by time sharing the host processor hardware of the host system. Some host systems may include more than one hardware processor so that true simultaneously processing occurs at the host since a plurality of processors are running in parallel. More often, there is merely one hardware processor that concurrently runs data processing tasks for the virtual machines by a time sharing technique. This technique is transparent to the end users at their user terminals.

The creation of a virtual machine on a host requires the use of interfaces between input and output devices available to the host for the user to communicate with the virtual machine. If the virtual machine is running a non-native software, that is a different operating system from the host, there is great difficulty in connecting to the virtual machine. There may be requirements on the virtual machine which are not provided for on the host which will necessitate additional hardware devices for input or output of the application running in a virtual machine on the host. An example would be for assistive technology devices for handicap users such as screen readers or Braille output devices.

A typical example is the use of java applications on a java virtual machine (JVM) environment. Accessibility bridges have been proposed to provide notification in the java virtual machine environment for calls to be placed through a java native invocation mechanism to an accessibility bridge to provide state data and other event information to the host. The process is plagued with problems created by garbage collection in the JVM where needed state data can be lost. Additionally, a management system where large amounts of data can be captured and carried and transferred back and forth between the virtual machine and the host would require tremendous amounts of memory for the data processed. The processing of large amounts of data is extremely slow and would limit the use of application programs from gaining access to other programs running on the host. Additionally, application and environment data that is not specified by the accessibility bridge would not be available to the host assistive technology.

Similarly, it is desirable that a separate application running natively on the host operating system may use the input/output objects connected to the host input/output manager.

What is needed is a system and method to allow otherwise independent applications running on a host and on a virtual machine resident in the host or as a separate application on the host to seamlessly cooperate with one another.

SUMMARY OF THE INVENTION

It is, therefore, an object of the invention to provide a means to allow the cooperation of an application running on a virtual machine or as a separate application to make use of input/output objects connected to the host assistive technology input/output manager.

It is another object of the invention to minimize the coding needed to allow cooperation between applications running on a virtual machine or as a separate application to use the input/output manager of the host assistive technology system.

These and other objects features and advantages are accomplished by a data processing system which allows the host system's devices to generate input to an application running in the virtual machine and allow the virtual machine's assistive technology application to send its output to the host's output devices. A system for providing input and output between a first assistive technology application running natively in an operating system and a second assistive technology application running on a virtual machine or as a separate application in the operating system is provided. An input/output manager in the first application manages inputs to and outputs from the second application. An input object in the second application receives input from the input object of the first application. An output object in the second application directs outputs to the output object of the first application. A communications channel between the input/output manager and the input and output methods passes input and output objects to connect the host's input and output to the virtual machine's input and output running in the host system.

The advantage is that each application can provide specialized and unique information about its particular environment without having to restrict itself to the common aspects of both environments. A further advantage is that the user is presented with a seamless interface between the two environments.

BRIEF DESCRIPTION OF THE DRAWINGS

The foregoing and other objects, aspects and advantages will be better understood from the following detailed description of a preferred embodiment of the invention with reference to the drawings, wherein.

DETAILED DESCRIPTION OF THE PREFERRED EMBODIMENT

The present invention implements a data processing system and method for sharing inputs and outputs between a provider assistive technology applications on a host operating system and a user assistive technology application running in a virtual machine resident on the host. The invention may be run on a variety of computers or collection of computers under a number of different operating systems. The computer could be, for example, a personal computer, a mini computer, mainframe computer or a computer running in a distributed network of other computers. Although the specific choice of computer is limited only by disk and disk storage requirements, computers in the IBM PC series of computers could be used in the present invention. One operating system which an IBM PC computer may run is IBM's OS/2 (TM).

In the alternative, the computer system might be in the IBM RISC System/6000 (TM) line of computers which run on the AIX (TM) operating system. The various models of the RISC System/6000 is described in many publications of the IBM Corporation. The AIX operation system is described in other publications of the IBM Corporation.

A microprocessor in the IBM PC series of computers is one of the Intel family of microprocessors including the 386,486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM may be used. Other RISC chips made by Hewlett Packard, Sun, Motorola and others may be used in the specific computer.

Figure 1:
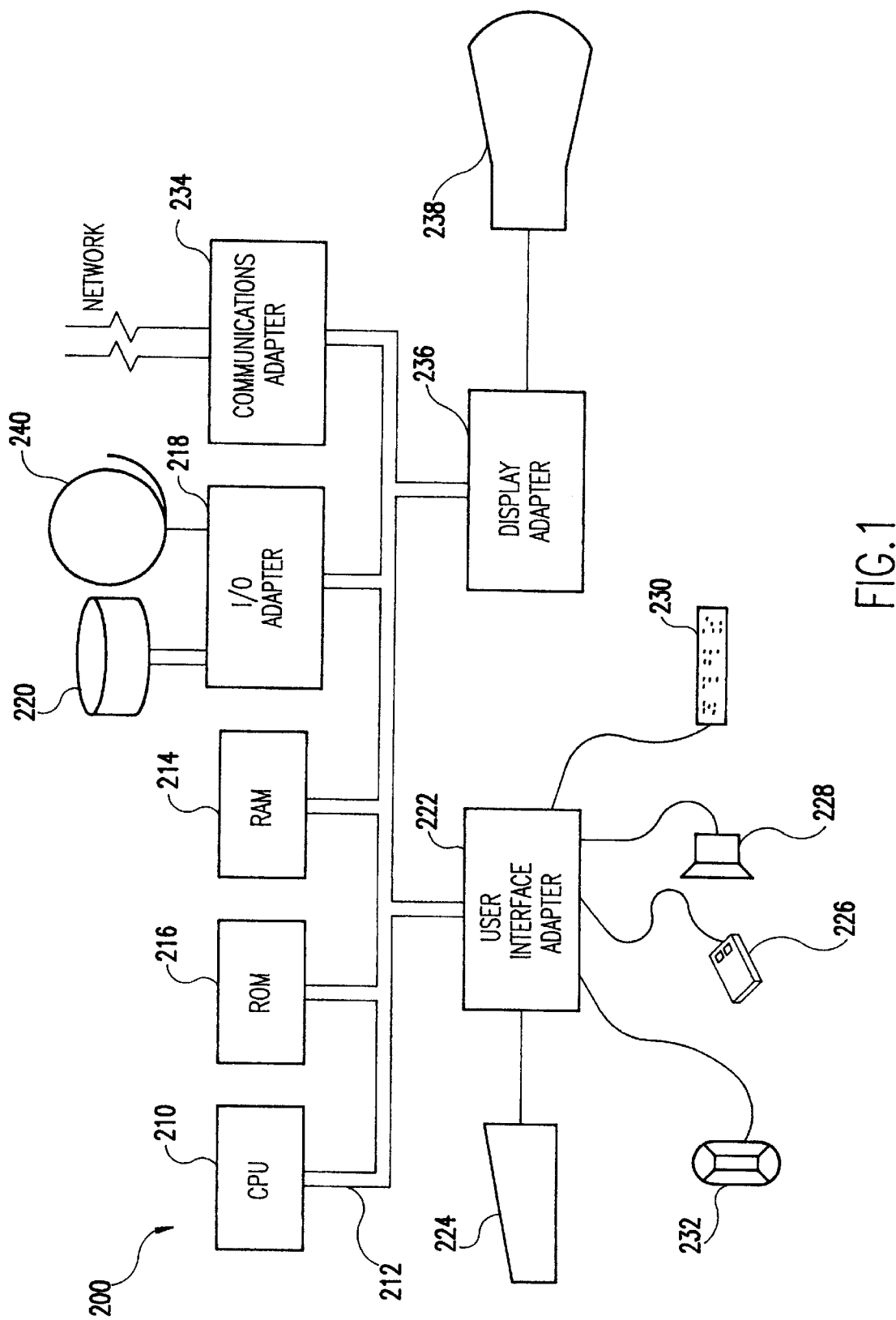
FIG. 1 illustrates, in block diagram form, a data processing system implemented in accordance with one embodiment of the present invention.

FIG. 1 illustrates a data processor 200 be utilized to implement a host computer system that executes the methodology of the present invention. The data processing system 200 comprises a central processing unit (CPU) 210 such as a microprocessor. CPU 210 is coupled to various components by a system bus 212. Read-only memory (ROM) 216 is coupled to the system bus 212 and includes a basic input/output system (BIOS) that control certain basic functions of the data processing system 200. Random access memory (RAM) 214, input/output adapter 218, and communications adapter 234 are also coupled to system bus 212. Input/output 218 may be a small computer system interface (SCSI) adapter that communicates with a disk storage device 220 or tape unit 240 or other device. Communications adapter 234 interconnects bus 212 with an outside network enabling the data processing system to communicate with other such systems. Input/output devices are also connected to system bus 212 via user interface adapter 222 and display adapter 236. Keyboard 224, trackball 232, mouse 226, speaker 228 and Braille output box 230 are all interconnected to bus 212 via user interface adapter 222. Display monitor 238 is coupled to system bus 212 by display adapter 236. In this manner, a user is capable of inputting to the system through keyboard 224, trackball 232, or mouse 226, and receiving output from the system via speaker 228 and display 238.

Some embodiments of the invention include implementations as a computer system program to execute the method or methods described herein, and as a computer program product. According to the computer system implementation, sets of instructions for executing the method or methods are resident in RAM 214 of one or more computer systems configured generally as described above. Until required by the computer system, the set of instructions may be stored as a computer program product in another computer memory. For example, in disk drive 220 (which may include a removable memory such as an optical disk or floppy disk for eventual use in disk drive 220).

Further, the computer program product can also be stored at another computer and transmitted in a computer readable medium when desired to the user's work station by a network or by an external network such as the Internet. One skilled in the art would appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

Note that the invention describes terms such as providing, loading, monitoring, or other terms that could be associated with the human operator. However, at least for a number of the operations described herein which form a part of the present invention, no action by a human operator is desirable. The operations described are, in large part, machine operations processing electrical signals to generate other electrical signals.

Figure 2:
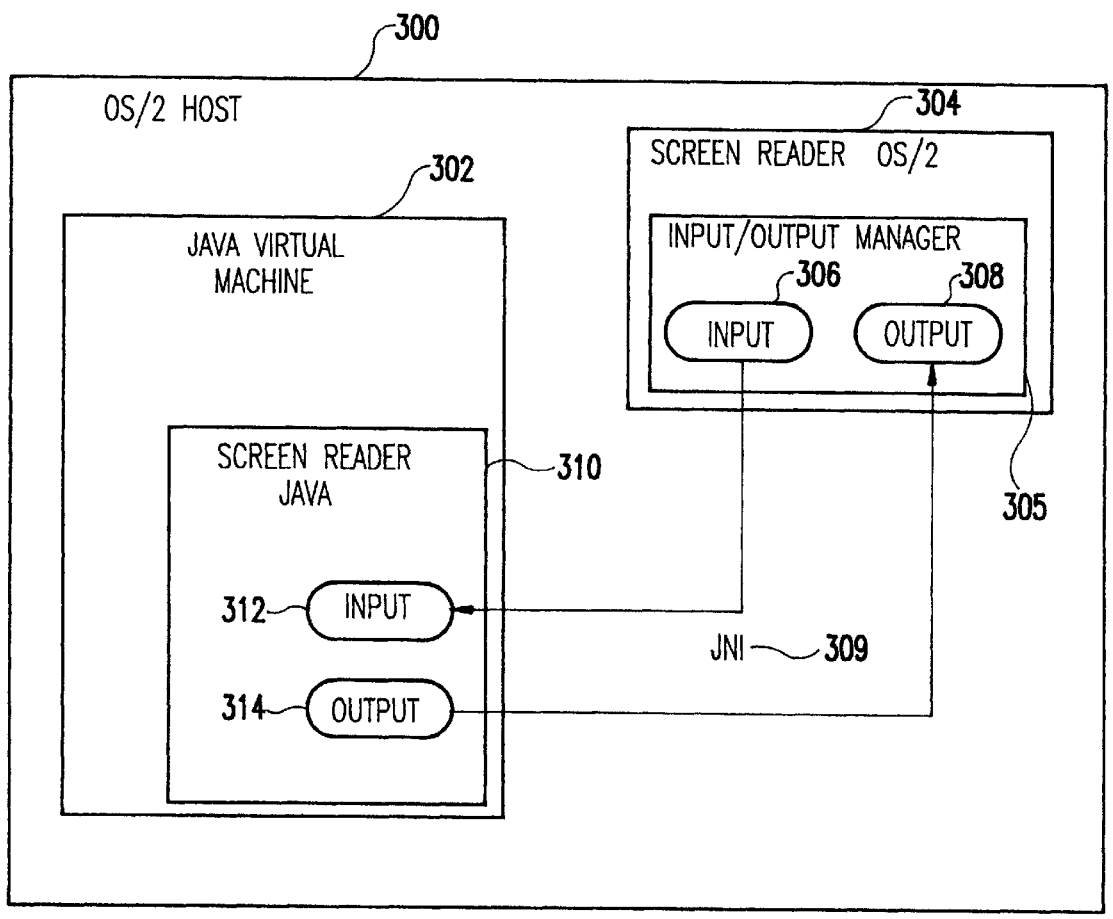
FIG. 2 illustrates, in block diagram form, the connection between assistive technology applications running within a host and virtual machine operating environment.

A description of operation of the present invention will now be provided in greater detail. Shown in FIG. 2 is an organizational illustration of a data processing system having a Java environment operating as a virtual machine environment in a host OS/2 host computer area. The Java programming language is adaptable to many different platforms. Java is a powerful object oriented language that allows for an external application to perform "introspection" on another application's objects. Introspection allows an application to iterate an object's methods and its signatures to then call the application's methods even though such methods and signatures are not built into an application. In an object oriented programming language, a class is a collection of data and methods that operate on that data. The data and methods describe a state and behavior of an object. Java includes a large number of classes, arranged in packages, that may be used in a program. For example, Java provides classes that create graphical user interface components, classes that handle input and output to a program and classes that support networking. A teaching of Java capabilities is discussed in U.S. patent application Ser. No. 08/971,256 entitled "A Data Processing System and Method for Creating Application Extensions", filed Nov. 17, 1997, to Schwerdtfeger et al., now U.S. Pat. No. 6,085,120, and is commonly assigned. The teachings therein are hereby incorporated by reference.

It should be noted that Java is a network programming language that is somewhat similar to the C and the C++ programming languages. However, unlike the C programming language, java is an object-oriented programming language. In addition to being an object-oriented programming language, java is an interpreted language. This means that the Java compiler generates byte-codes for a Java Virtual Machine rather than native machine codes such as that typically implemented. It should be noted that the JVM may be implemented as a hardware integrated circuit or as a software emulation program. To actually execute a Java program, the JVM is used to execute the compiled byte-codes. Because Java byte-codes are platform-independent, Java programs can be run on any platform that the JVM has been ported to.

Illustrated in FIG. 2 is a host data processing system which may be running an IBM OS/2 operating system, 300, and has running on it a virtual machine such as a Java virtual machine, 302. This Java virtual machine is non-native to the host system. The host system has an assistive technology application such as IBM Screen Reader/2, 304, with an Input/Output Manager, 305, with input, 306, and output, 308, for interfacing with input and output devices such as an IBM Screen Reader Keypad or Braille inputs and synthesized speech or Braille outputs. Resident in the Java virtual machine is an assistive technology application such as the IBM Screen Reader for Java, 310, which has a need for inputs 312, and outputs, 314. It is the task of the 110 Manager, 305, to specify and determine when input from the physically attached device is directed to the input interface, 312, and when output, 314, received from the "client" assistive technology is directed to the physically attached output device. The Java Native Invocation (JNI) interface, 309, is resident in the Java programming language. The JNI is used to bridge between the input, 312, and output, 314, methods of the "client" assistive technology and the input, 306, and output, 308, methods of the "host" assistive technology.

It would very expensive and inefficient to require additional hardware devices for providing inputs and outputs to and from the Java virtual machine separate from the host computer, or to share devices by closing and opening them as needed.

Figure 3:
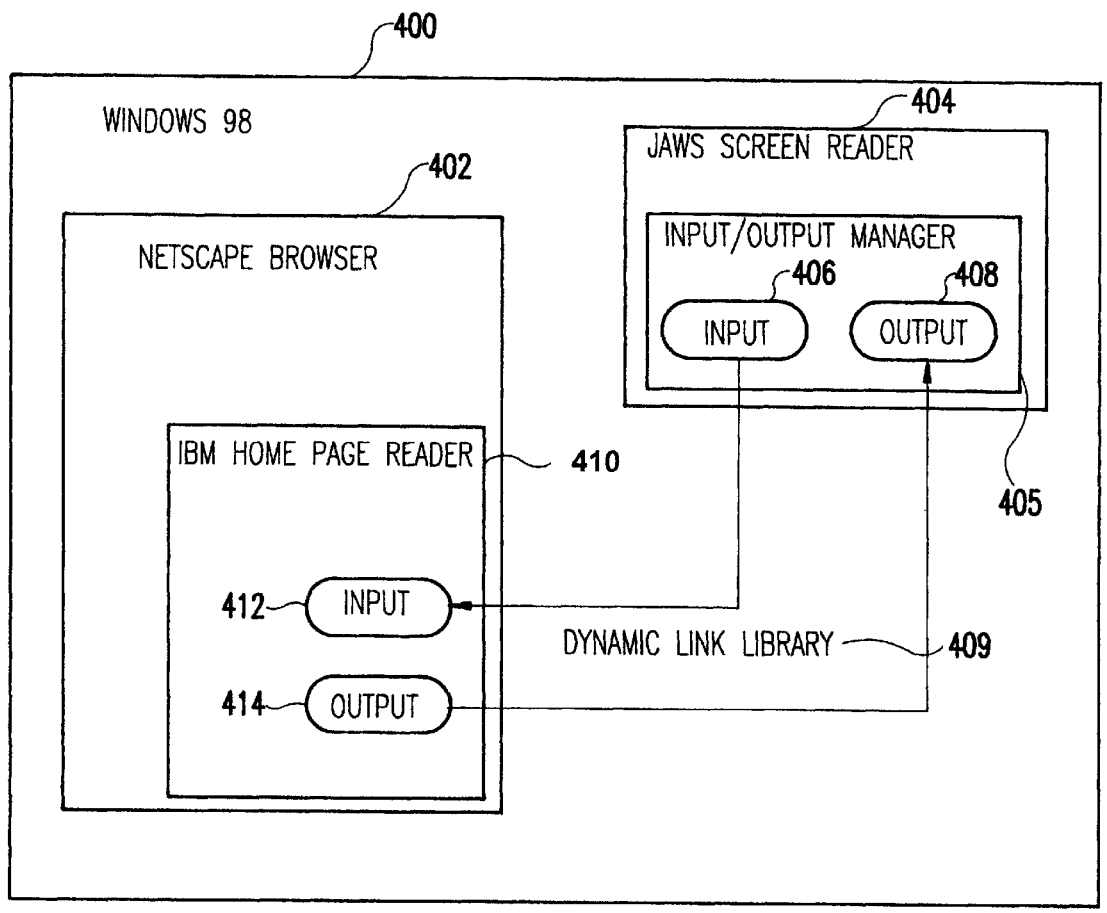
FIG. 3 illustrates, in block diagram form, a provider and user application operating in the same native environment.

Illustrated in FIG. 3 is a host data processing system which may be running Microsoft Windows 98, 400, and has running on it a Windows application such as Netscape Navigator, 402. The illustration shows a separate application making use of input/output objects connected to the host assistive technology input/output manager. In this illustration, the "client" environment is native to the host operating system. The host system has an assistive technology application such as the Henter Joyce JAWS screen reader, 404, with an Input/Output Manager, 405, with input, 406, and output, 408, for interfacing with similarly specialized input and output devices. Running on the host, but specifically in association with the client environment, is a specialized assistive technology such as IBM Home Page Reader, 410, which has a need for inputs, 412, and outputs, 414. A Windows sharable module, a Dynamic Link Library, 409, is the bridge between the input, 412, and output, 414, methods of the "client" assistive technology and the input, 406, and output, 408, methods of the "host" assistive technology.

Figure 4:
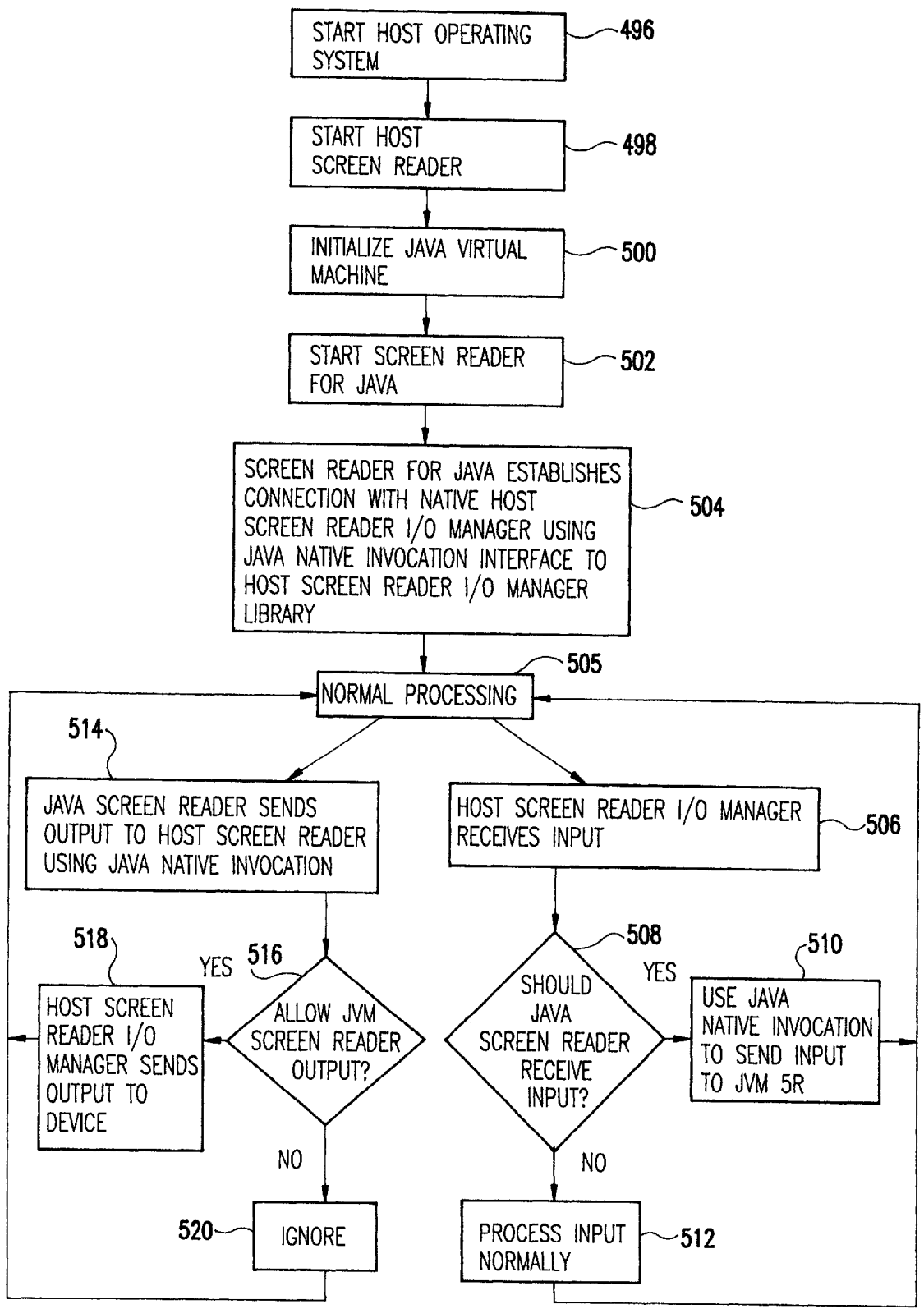
FIG. 4 illustrates, in flow chart form, a methodology implemented in accordance with one embodiment of the present invention.

Illustrated in FIG. 4 is a series of steps that lead to the sharing of inputs and outputs between the assistive technology application running in the host operating system and the assistive technology application running in a virtual machine. In one embodiment of the present invention, the operating system is started in a step 496. Next, the host screen reader is initiated in step 498. The sharing of the input/output devices will be instigated when a Java virtual machine is initialized, step 500, upon a host computer. By initializing Java, an application such as the IBM Screen Reader for Java is made available to an end user and is initialized, step 502. As part of this initialization, SR/Java establishes the connection to the host assistive technology's I/O Manager using the Java Native Invocation interface, step 504. Other than input/output requests normal processing is carried out as shown in step 505. When input is received by the host assistive technology's I/O Manager, step 506, a decision, step 508, is made whether to direct the input to the Java assistive technology. The input will then be sent to the Java Screen Reader, step 510, or to process input "normally" within the native Screen Reader, step 512. When output is sent by the Java Screen Reader using Java Native Invocation, step 514, a decision in the host assistive technology's I/O Manager, step 516, is made whether to send the output to the attached device, step 518, or to ignore the output, step 520.

What has been shown is the creation of an assistive technology device input/output object subsystem that allows the host systems assistive technology application to generate command events to an assistive technology application running in the Java virtual machine and allows output from an assistive technology application running in the Java virtual machine to generate output events to an assistive technology application running on the host.

The foregoing has provided an example of operation of the present invention. Furthermore, while there have been provided here in the principals of the invention, it is to be clearly understood to those skilled in the art that this description is made by way of an example only and is not a limitation to the scope of the invention. For example, the use of the application as described should not be limited and the host operating system may be any of a number from available host operating systems.

Having thus described the present invention and its preferred embodiments in detail, it will be readily apparent to those skilled in the art that further modifications to the invention may be made without departing from the spirit and scope of the invention as presently claimed.

What is claimed is:

1. A data processing system for providing input and output between a first assistive technology application and a second assistive technology application, comprising:

an input/output manager in the first assistive technology application to manage inputs to and outputs from the second assistive technology application;

an input method in the second assistive technology application to receive input from the first assistive technology application;

an output method in the second assistive technology application to send outputs to the first assistive technology application; and a channel between the input/output manager and the input and the output methods to pass input and output, wherein the first assistive technology application is running natively in an operating system and the second assistive technology application is running in a virtual machine within the operating system.

2. The data processing system as recited in claim 1, wherein the second assistive technology application is a Java application running in a Java virtual machine.

3. The data processing system as recited in claim 1, wherein the channel between the input/output manager of the first assistive technology application and the input and output methods of the second assistive technology application provide input/output of a special purpose for accessibility to a handicapped user.

4. The data processing system as recited in claim 3, wherein the system further comprises alternative means for communication between the first and second applications for input and/or output.

5. A data processing system as recited in claim 1, wherein the second assistive technology application is a Java application running in a Java virtual machine, wherein the first assistive technology application is running natively in an operating system, wherein the channel between the input/output manager and the input and output methods is for accessibility to a handicapped user, and wherein the system further comprises alternative means for communication between the first and second assistive technology applications for input and/or output.

6. A method of using a data processor having a first assistive technology application and a second assistive technology application, comprising the steps:

creating an input/output method in the first application to manage inputs to and outputs from the second application;

establishing an input method in the second application to receive input from the first application;

establishing an output method in the second application to send outputs to the first application; and forming a channel between the input/output manager and the input and the output method to pass input and output, wherein the first assistive technology application is running natively in an operating system and the second assistive technology application is running in a virtual machine within the operating system.

7. The method as recited in claim 6, wherein the second assistive technology application is a Java application running in a Java virtual machine.

8. A method as recited in claim 6, wherein the channel between the input/output manager of the first assistive technology application and the input and output methods of the second assistive technology application provide input/output of a special purpose for accessibility to a handicapped user.

9. A method as recited in claim 8, wherein the system further comprises alternative means for communication between the first and second applications for input/output.

10. A method as recited in claim 6, wherein the second assistive technology application is a Java application running in a Java virtual machine, wherein the first assistive technology application is running natively in an operating system, wherein the channel between the input/output manager and the input and output methods is for accessibility to a handicapped user, and wherein the system further comprise alternative means for communication between the first and second assistive technology applications for input/output.

11. A computer program product in a computer readable medium for providing input and output between a first assistive technology application and a second assistive technology application, comprising:

means for creating an input/output method in the first application to manage inputs to and outputs from the second application;

means for establishing an input method in the second assistive technology application to receive input from the first assistive technology application;

means for establishing an output method in the second assistive technology application to send outputs to the first assistive technology application; and means for forming a channel between the input/output manager and the input and the output method to pass input and output, wherein the first assistive technology application is running natively in an operating system and the second assistive technology application is running in a virtual machine within the operating system.

12. The computer program product as recited in claim 11, wherein the second assistive technology application is a Java application running in a Java virtual machine.

13. The computer program product as recited in claim 11, wherein the channel between the input/output manager of the first assistive technology application and the input and output methods of the second assistive technology application provide input/output of special purpose accessibility to a handicapped user.

14. The computer program product as recited in claim 13, wherein the system further comprises alternative means for communication between the first and second applications for input/output.

15. The computer program product as recited in claim 11, wherein the second assistive technology application is a Java application running in a Java virtual machine, wherein the first assistive technology application is running natively in an operating system, wherein the channel between the input/output manager and the input and output methods is for accessibility to a handicapped user, and wherein the system further comprises alternative means for communication between the first and second assistive technology applications for input/output.

* * * * *